(12) United States Patent
El-Hanany et al.

(10) Patent No.: US 7,166,848 B2
(45) Date of Patent: Jan. 23, 2007

(54) THREE DIMENSIONAL RADIATION DETECTOR

(75) Inventors: Uri El-Hanany, Rehovot (IL); Arie Shahar, Moshav Magshimim (IL); Shimon Klier, Savion (IL); Alex Tsigelman, Petach Tikva (IL); Eldan Halberthal, Mazor (IL)

(73) Assignee: Orbotech Medical Solutions Ltd., Yavne (IL)

( * ) Notice: Subject to any disclaimer, the term of this patent is extended or adjusted under 35 U.S.C. 154(b) by 111 days.

(21) Appl. No.: 10/179,909

(22) Filed: Jun. 25, 2002

(65) Prior Publication Data

US 2003/0010924 A1 Jan. 16, 2003

(30) Foreign Application Priority Data

Jun. 25, 2001 (IL) .................................. 143980

(51) Int. Cl.
*G01T 1/24* (2006.01)
(52) U.S. Cl. ................ 250/370.09; 250/370.1
(58) Field of Classification Search ........... 250/370.09, 250/370.1, 370.08
See application file for complete search history.

(56) References Cited

U.S. PATENT DOCUMENTS

| | | | | |
|---|---|---|---|---|
| 4,937,453 A | * | 6/1990 | Nelson | 250/370.09 |
| 5,701,086 A | * | 12/1997 | Wardwell | 324/762 |
| 5,777,338 A | | 7/1998 | He | |
| 5,821,540 A | * | 10/1998 | Sato et al. | 250/370.06 |
| 6,037,595 A | | 3/2000 | Lingren | |
| 6,046,454 A | | 4/2000 | Lingren et al. | |
| 6,091,070 A | | 7/2000 | Lingren et al. | 250/370.09 |
| 6,114,703 A | * | 9/2000 | Levin et al. | 250/367 |
| 6,236,051 B1 | | 5/2001 | Yamakawa et al. | 250/370.1 |
| 6,285,029 B1 | | 9/2001 | Shahar et al. | 250/370.14 |
| 6,346,706 B1 | * | 2/2002 | Rogers et al. | 250/363.04 |
| 6,448,560 B1 | * | 9/2002 | Tumer | 250/370.09 |
| 6,528,795 B1 | * | 3/2003 | Kurfess et al. | 250/370.1 |
| 6,552,347 B1 | * | 4/2003 | Dimcovski | 250/363.01 |
| 6,621,084 B1 | * | 9/2003 | Wainer et al. | 250/370.09 |

(Continued)

FOREIGN PATENT DOCUMENTS

WO 00/17670 3/2000

*Primary Examiner*—Albert Gagliardi
(74) *Attorney, Agent, or Firm*—Ladas and Parry LLP

(57) ABSTRACT

A pixelated detector assembly comprising a stack of thin detector crystals, each detector crystal having a pair of planar surfaces bound by edges substantially thinner than the dimensions of the surfaces. The stack is disposed such that the radiation to be detected is incident on one set of edges of the stack of detector crystals. The dimension of the planar surfaces in the general direction of incidence of the radiation incidence is sufficient to ensure that substantially all of the high energy photons to be detected are absorbed within the depth of the detector assembly. Each of the detector crystals has a two-dimensional pixelated anode array formed on one of its planar surfaces. A cathode is formed on its opposite planar surface, preferably covering substantially all of the surface. The position of interaction of a photon in the plane perpendicular to the direction of the incident radiation, is determined by which of the detector crystals in the stack detects the absorption, and by which of the rows of pixelated anodes in that crystal detects the absorption. The depth of interaction of a photon is determined by the location of the particular anode pixel in the above-mentioned row of pixelated anodes where the photon absorption is detected. The detector assembly is thus able to detect the point of interaction of a photon in all three dimensions.

11 Claims, 3 Drawing Sheets

U.S. PATENT DOCUMENTS

2001/0021608 A1* 9/2001 Borbolla et al. ............ 439/676

2002/0017609 A1* 2/2002 Danielsson ............ 250/370.09

* cited by examiner

THREE DIMENSIONAL RADIATION DETECTOR

FIELD OF THE INVENTION

The present invention relates to the field of semiconductor radiation detectors, both for X-rays and Gamma-rays, and in particularly to high energy detection, coincidence detection and combinations of high energy and lower energy detection.

BACKGROUND OF THE INVENTION

One of the most important properties of radiation detectors is the detection sensitivity. The higher the sensitivity, the lower the level of radiation to which the patient needs to be exposed, in order to obtain a meaningful image. The sensitivity is strongly dependent on the stopping power of the detector. The stopping power of the detector is a function of the absorption coefficient of the material from which the detector is made, and the detector thickness. The absorption coefficient is an intrinsic property of the material of the detector, and it decreases very rapidly with the energy of the detected radiation. Thus, for instance, a detector made of a 5 mm. thick layer of Cadmium Zinc Telluride absorbs about 93% of incident 140 keV photons, whereas for 511 keV photons, as produced in electron-positron annihilation events, only about 20% are absorbed in such a thin layer.

Accordingly, in order to efficiently detect high-energy radiation, it is necessary to increase the detector absorption by increasing its thickness. This can be achieved in a number of ways. The simplest method is to increase the thickness of the detector layer, while maintaining the classic, prior art pixelated anode and single cathode geometry. This solution has a number of disadvantages.

Firstly, the probability of having defects in the crystal volume from which the detector is sliced increase dramatically with the thickness of the detector. Consequently, the production yield of such a detector is very low. A solution for this yield problem is described in co-pending U.S. patent application Ser. No. 09/123,754 for "Semiconductor Gamma-ray Detector" by one of the present applicants. In this invention, there is described a stack of several layers of two dimensional detector modules, each module being divided into an array of separate pixelated detector cells, by means of the pixelation of the electrodes on the surfaces of the modules. However, because of the series current through all of the detector layers, the thickness of such a stack is limited.

Secondly, the location from which the detected Photons are emitted in a Gamma ray camera is derived from the detection location made in the depth of the detector. This is known as the Depth of Interaction (DOI), and only a knowledge of the DOI enables parallax effects to be eliminated and the correct spatial origin of the photons to be determined. The simple single slab detector described in the prior art is unable to able to determine the DOI. Furthermore, the stacked detectors disclosed in the above-mentioned U.S. patent application Ser. No. 09/123,754 cannot determine the particular layer in which the absorption takes place, since equivalently located pixels of all of the layers are connected in series. There are methods for deriving the DOI, such as that described in the article entitled "Position-sensitive single carrier CdZnTe detectors" by Z. He et. al., published in Nuclear Instruments and Methods in Physics Research A, Vol. 388, (1997) pp.180–185, but they are complex and inaccurate, especially when used in high energy detection schemes.

Thirdly, for a voltage V applied between anode and cathodes, the efficiency of charge collection is proportional to $V/L^2$, where L is the detector thickness. The leakage current, on the other hand, is proportional to $V/L$. Consequently, if, in order to increase the absorption probability, the thickness L of the detector is increased by a given factor, in order to maintain the same charge collection efficiency, the applied voltage should be increased by the square of that factor. The result is a very high operating voltage, which is more difficult to generate and manage, and which may present a safety hazard. In addition, such an increase in the applied voltage causes the leakage current to increase by the same factor, and results in degradation of the detector energy resolution ability.

Fourthly, as a result of the increase in detector thickness, the transit time of the charge carriers across the detector may become longer than the time window used to identify a coincidence event between the two detectors of a PET Gamma camera. In such a case, it may be impossible to use coincidence methods as an electronic collimator. One way of solving this problem is described in co-pending Israel patent application No. 137,579. However, the technique described in this application is not easy to implement.

Finally, when high-energy photons are detected in a thick detector, the probability of the occurrence of multiple events, by Compton scattering, may become comparatively significant, and such multiple events render it impossible to define the source location of the event producing the relevant detected photons.

In the PCT Application published as document No. WO 017670 for "Pixelated Photon Detector" to N. Wainer et al., there is described a detector arrangement providing a large absorption thickness, achieved by stacking a number of thin detectors, and directing the radiation onto the stack from its side, through the thin edges of the individual layers. rather than through the stack from one end towards the other, as is described in the above mentioned U.S. patent application Ser. No. 09/123,754. The layers of thin detectors are electrically unconnected, such that each layer can be used to provide impingement location information. In WO 017670, each of the thin detector layers has an array of anode strips running the length of the detector layer surface, in a direction generally parallel to the direction of impingement of the radiation to be detected. The two dimensional impingement location data is therefore obtained from a knowledge of the layer in which the photons, or most of the photons, are detected, thus providing location in one axis, and from a knowledge of the anode strip or strips in that layer in which the photons, or most of the photons, are detected, thus providing location data in the orthogonal direction.

This prior art detector therefore overcomes a number of the disadvantages and problems mentioned above with respect to simple thick detectors. It is thick, yet is made from thin slices, thus providing a good production yield. It should have high stopping power yet relatively low leakage current, since each layer has its own independent voltage applied. Its charge carriers have very little distance to travel, thereby avoiding problematic coincidence ambiguities, and finally, multiple events from effects such a Compton scattering are distinguished.

However, the described detector is unable to provide any Depth of Interaction information, and thus has no three dimensional detection capabilities. As a result, it cannot be usefully used in PET cameras, since without DOI information, parallax effects prevent the unambiguous determination of the location of the source of the emitted photons in the subject's body.

There is therefore an important need for a detector which will provide all of the above-mentioned advantages of a thick detector, but will provide three dimensional detection information, such that the depth of interaction within the detector can be uniquely determined.

The disclosures of each of the publications mentioned in this section and in other sections of the specification, are hereby incorporated by reference, each in its entirety.

SUMMARY OF THE INVENTION

The present invention seeks to provide a new radiation detector having a thickness in the direction of the incident radiation, large enough to absorb substantially all incident high energy photons produced by positron-electron annihilation phenomena, and capable of determining the depth of interaction of the incident photons in the detector, but without the disadvantages mentioned hereinabove of prior art detectors with regard to production yield, leakage current, convenience of operating voltage, charge carrier transit distance within the detector, and the ability to distinguish multiple events from effects such as Compton scattering. Such a detector thus provides data about the absorption location of incident photons in all three dimensions. A pair of such detectors could then be advantageously used in a parallax-free PET camera.

There is thus provided in accordance with a preferred embodiment of the present invention, a pixelated detector assembly comprising a plurality of thin detector crystals, each detector crystal having a pair of planar surfaces bound by edges substantially thinner than the dimensions of the surfaces. The plurality of detector crystals are arranged in a stack with their planar surfaces one on top of the other and their edges parallel. The stack is disposed such that the radiation to be detected is incident on one set of edges of the stack of detector crystals. The dimension of the planar surfaces in the general direction of the radiation incidence is sufficient to ensure that substantially all of the aforementioned high energy photons to be detected, are absorbed within the depth of the detector assembly. Each of the detector crystals has a two-dimensional pixelated anode array formed on one of its planar surfaces. A cathode is formed on its opposite planar surface, preferably covering substantially all of the surface.

The position of interaction of a photon in said detector assembly, in the plane perpendicular to the general direction of the incident radiation, is determined by which of the detector crystals in the stack detects the absorption, and by which of the rows of pixelated anodes in that crystal detects the absorption. The term row, as related to the pixelated anode array, is used in this description to refer to rows of anode pixels arranged in the general direction of incidence of the radiation, and the term column, as related to the pixelated anode array, is used in this description to refer to columns of anode pixels generally perpendicular to the general direction of incidence of the radiation.

The depth of interaction of a photon in said detector assembly is determined by the location of the particular anode pixel in the above-mentioned row of pixelated anodes where the photon absorption is detected. The pixelated detector assembly as described above is thus able to detect the point of interaction of a photon in the assembly in all three dimensions.

In order to simplify the explanation of the construction and operation of the detector assembly according to the present invention, the photon absorption has been described in this specification, and claimed as though it takes place in an infinitesimally small volume of a single thin detector crystal and in the vicinity of an individual pixel anode. It is, however, to be understood that in actuality, an incident photon may deposit its energy by producing electron-holes pairs along a finite length path in the detector assembly, such that the charge carriers are distributed between adjacent pixels. The effective interaction location is obtained by taking weighted averages of the induced charges arising from all of the pixels associated with the event, even if in adjacent crystals.

A connector circuit board is preferably located between adjacent detector crystals in the stack, and makes electrical contact with the pixelated anodes of the detector crystal on one side of it, and the cathode of the detector crystals on its other side. The voltages are applied to the individual detector pixels by means of this circuit board, and the currents generated in the individual detector pixels are led out thereby. Since the spaces in the stack between the thin detector crystals are dead space as far as the detection functionality is concerned, the circuit board is made of as thin a construction as possible, and according to another preferred embodiment of the present invention, a thin flexible kapton substrate is used, with the requisite conductors coated thereon, and bonded or conductively glued to the anodes and cathode of each detector crystal. The use of this geometry enables the signal processing electronic circuitry to be located at the back of the stack, away from the absorption volume of the detector assembly. In this way, a high volume detection utilization of the detector assembly is achieved.

There is also provided in accordance with a further preferred embodiment of the present invention, a gamma ray camera utilizing at least two detector assemblies as described above. As a result of the three-dimensional absorption location detection ability of the detector assemblies, resulting from their ability to determine the depth of interaction, the camera is able to determine the source of the positron-electron annihilation event which produced the detected photon pair, by calculating the line connecting the true positions of absorption of the photon pair. In this way, the location of the source of the event can be determined substantially without parallax errors.

Furthermore, since the location of each absorption event is known in all three dimensions in the detector assembly, together with the energy imparted at each absorption event, it is possible to accurately reconstruct the paths of photons which have undergone Compton scattering, thus enabling every measured absorption to be taken into account in determining the source location of the photons. Such a detector, according to another preferred embodiment of the present invention, could then be advantageously used in a Compton telescope camera, as a single detector in place of the two separate, spaced detectors generally used in the Compton telescope camera.

BRIEF DESCRIPTION OF THE DRAWINGS

The present invention will be understood and appreciated more fully from the following detailed description, taken in conjunction with the drawings in which:

FIG. 3A shows the complete detector assembly, and FIG. 3B shows how the anodes and cathodes of a pair of individual detector layers are connected to the printed circuit board for outputting.

DETAILED DESCRIPTION OF PREFERRED EMBODIMENTS

Figure 1:
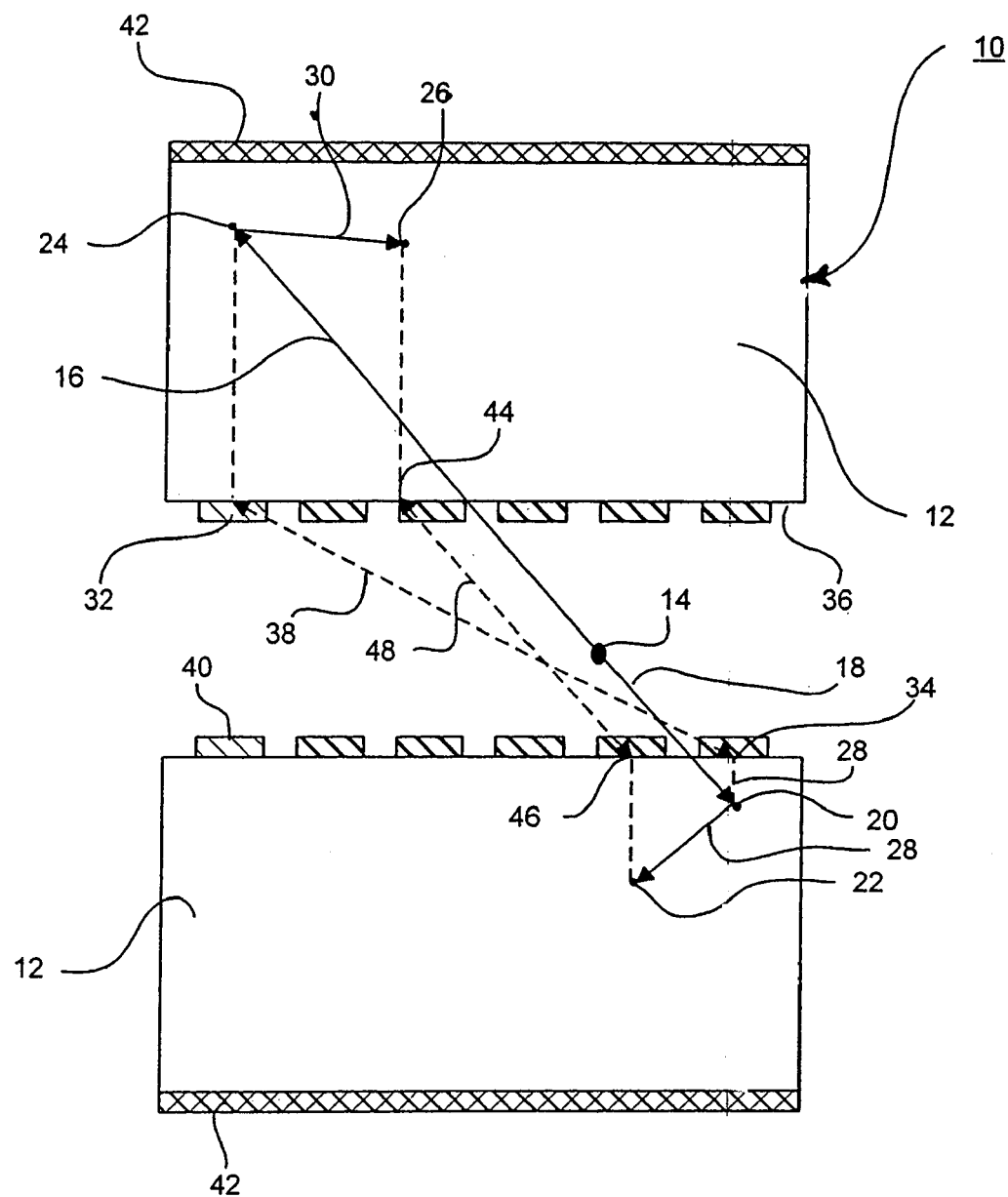
FIG. 1 is a schematic illustration of a conventional pair of semiconductor radiation detectors for use in a two-headed Gamma-Ray camera.

Reference is now made to FIG. 1, which illustrates schematically a two-headed Gamma ray camera 10 including two identical thick conventional prior art pixelated semiconductor detectors 12, designed to detect high-energy radiation produced by positron emission at point 14, whose location is to be imaged. From point 14 photons 16 and 18 are emitted with the same energy and along oppositely directed directions. Photon 18 might be absorbed at point 20 or alternatively might be scattered by Compton scattering as photon 28 to be absorbed at point 22. Similarly, photon 16 might be absorbed at point 24 or alternatively might be scattered by Compton scattering as photon 30 to be absorbed at point 26.

The location 14 from which the photons are emitted is derived from the detection location made by detectors 12. For example, in a situation when photons 16 and 18 are absorbed at points 20 and 24, the line on which point 14 is located should be derived by drawing a line that connects points 20 and 24. The prior art detectors shown in FIG. 1 are not capable of detecting the Depth Of Interaction (DOI). Thus the position of points 20 and 24 can only be defined by their projections 32 and 34 on pixel-planes 36 of detectors 12. In this situation, the line on which point 14 is apparently located is wrongly determined as the line 38 connecting points 32 and 34. This effect is known as parallax, and it essentially prevents accurate determination of the position of the imaged points in the patient's body. The parallax error can be eliminated if the DOI is known, requiring a detector assembly capable of imaging in all three dimensions.

Furthermore, when high-energy photons are detected by thick detectors 12, there is a quite high probability of the occurrence of multiple events, such as arises from Compton scattering. An example of a process including multiple events is illustrated by photons 16 and 30, and 18 and 28. Interaction points 20, 22, 24, and 26 in detectors 12 are detected as projected points 34, 46, 32, and 44 respectively, these points bring the projection of points 20, 22, 24, and 26 onto the pixels planes 32 of the detectors 12. In this situation there is uncertainty which of the derived interaction lines is the correct line, from all the possible lines lying between lines 38, 48, and from other lines connecting points 32 and 44 on one head to points 34 and 46 on the other head respectively. In additional, even if the right line would be used to construct the image, it will still be subject to the above-mentioned parallax error.

Figure 2:
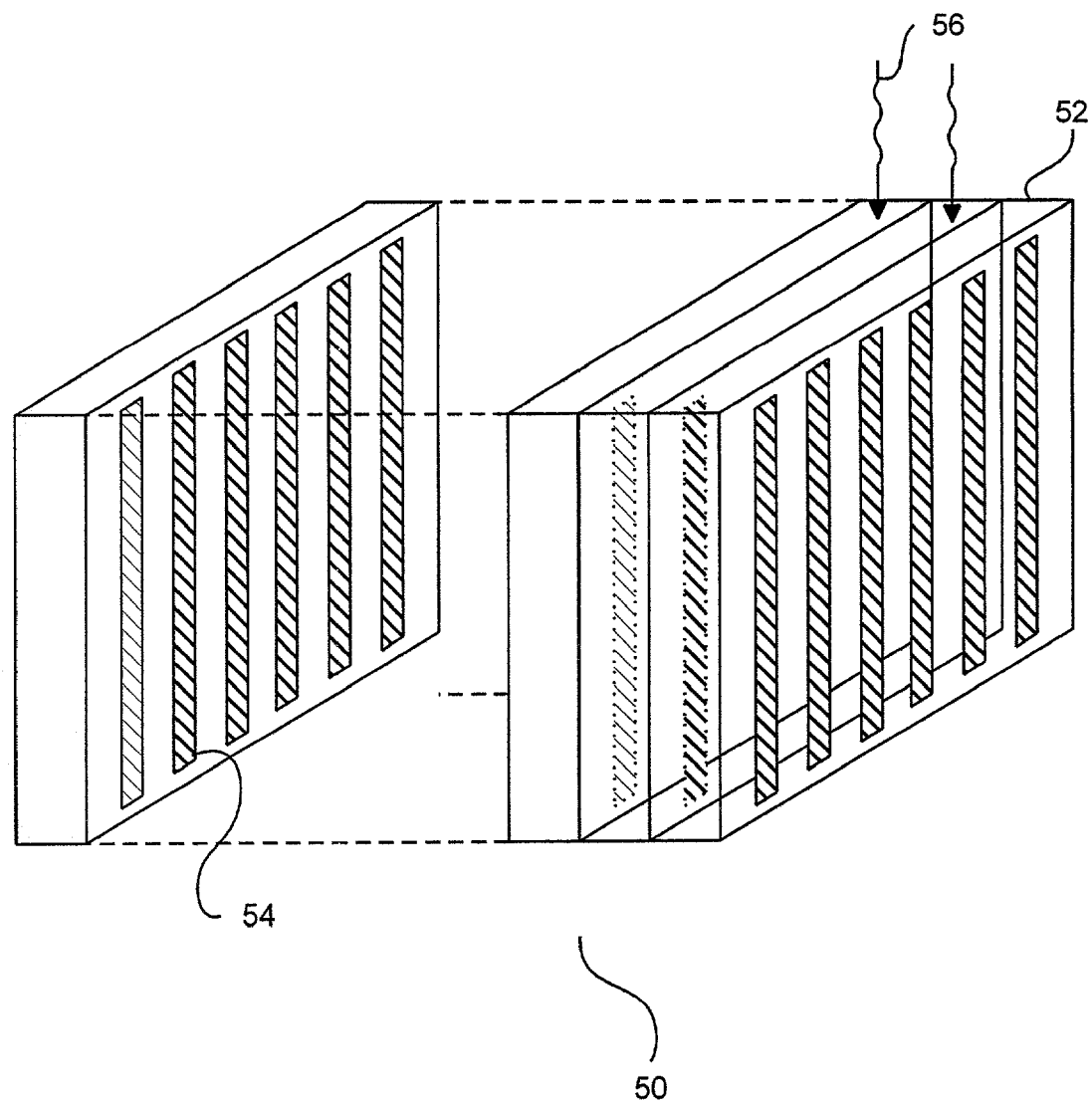
FIG. 2 is a schematic illustration of a prior art detector using a stack of thin detectors having strip anodes.

Reference is now made to FIG. 2, which is a schematic illustration of a prior art detector 50 using a stack of thin detectors 52 having strip anodes 54, such as that shown in WO 017670. The thin detectors are disposed relative to the incident photons 56 to be detected such that the anode strips are generally parallel to the direction of incidence of the photons 56. Though many of the inherent disadvantages of the simple, single thick layer geometry of each detector in FIG. 1 is overcome, the detector of FIG. 2 still does not provide any DOI information, or multiple event determination, both of which are necessary to allow the accurate imaging of the source point within the patient's body.

Figure 3A:
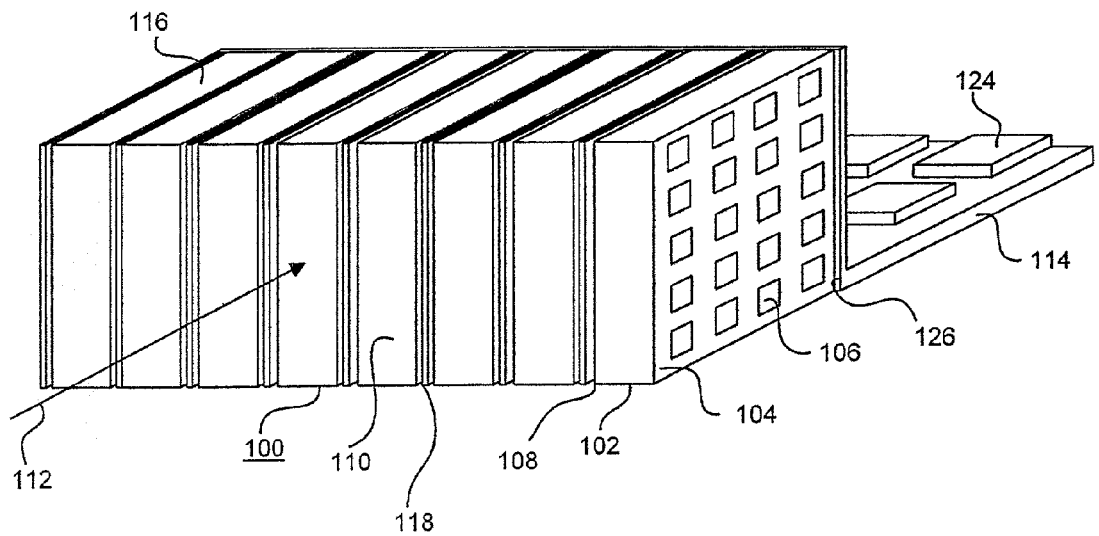
FIGS. 3A and 3B are schematic illustrations of the detector according to a preferred embodiment of the present invention.
Figure 3B:
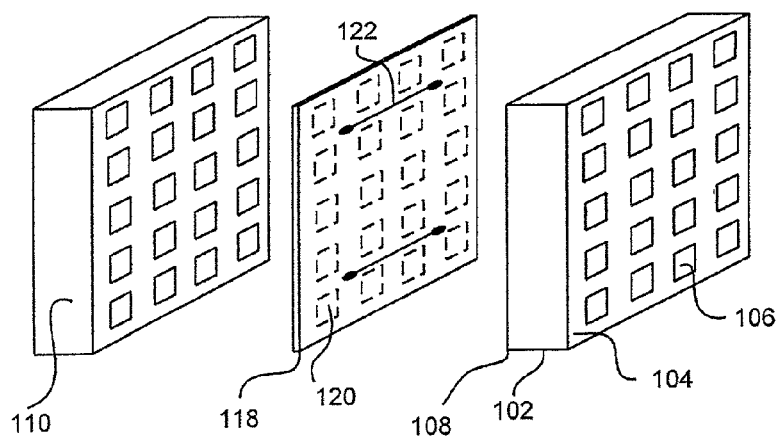

Reference is now made to FIGS. 3A and 3B, which are schematic illustrations of a detector assembly 100 constructed and operative according to a preferred embodiment of the present invention. FIG. 3A shows the complete detector assembly including a stack of multiple, thin, semiconductor crystal detectors 102, each having an anode side 104 comprised of a two-dimensional array of pixelated anodes 106 and a single monolithic cathode 108 on the opposite side. The term "thin" in relation to the detectors 102, as used throughout this specification and as claimed, is meant to indicate that the thickness of the detectors is substantially smaller than the dimensions of their surfaces on which the anodes and cathodes are located. The stack of detectors 102 is so disposed as to receive impinging radiation 112 through the detector sidewalls 110. The detectors 102 are preferably mounted on an "L" shaped printed circuit board (PCB) 114. Other PCB's 118 are located between every two adjacent detectors 102. PCB's 118 are preferably constructed of a flexible and isolating polymer such as Kapton, onto which conductive leads are evaporated or printed for connection to the pixelated array of anodes and the cathodes. Such a PCB can be constructed having a very small thickness, such that the dead space between individual detectors 102 is minimized.

Furthermore, when high-energy photons are detected by thick detectors 12, there is a quite high probability of the occurrence of multiple events, such as arises from Compton scattering. An example of a process including multiple events is illustrated by photons 16 and 30, and 18 and 28. Interaction points 20, 22, 24, and 26 in detectors 12 are detected as projected points 34, 46, 32, and 44 respectively, these points being the projection of points 20, 22, 24, and 26 onto the pixels planes 36 of the detectors 12. In this situation there is uncertainty which of the derived interaction lines is the correct line, from all the possible lines lying between lines 38, 48, and from other lines connecting points 32 and 44 on one head to points 34 and 46 on the other head respectively. In additional, even if the right line would be used to construct the image, it will still be subject to the above-mentioned parallax error.

The connector PCB's 118 direct the electrical signals produced by detectors 102 to PCB 114. On PCB 114, there are mounted ASIC's 124, operative to process the signal data received from the anodes 106. The outermost connector PCB 118, which fits into space 126 has been removed in FIG. 3A, to show the pixelated anode structure on the separate detectors 102.

The ASIC's 124 are preferably in electrical communication, such that signals from different pixels may be processed together, even if those pixels are located on different detectors 102.

The position of impingement of the detected radiation in the X-Y plane is determined by the row of the pixels 106 which detects the incoming photons, and by the separate detector 102 in which these pixels are situated. The pitch of the pixels 106 determines the spatial resolution in the Y-direction while the resolution along the X-axis is determined by the thickness d of detectors 102. The Depth Of Interaction (DOI) is simply derived by the column of the pixel that detects an event along the Z-direction. The accuracy with which the DOI can be determined is dependent on the anode pixel pitch in the Z-direction.

The large dimension of detectors 102 in the Z-axis assures a high absorption power of the detectors. At the same time, the bias voltage, the transit time, and the leakage current are all dependent on the thickness of the individual detectors 102, which is sufficiently small as to provide favorable characteristics for these three properties.

The ability of detector 100 to accurately measure the DOI makes it an effective three dimensional (3D) detector. By measuring the DOI the exact direction of the trajectory of the photons in radiation 112 can be derived accurately, by eliminating the parallax error. In a situation where multiple events are detected at the same time, knowledge of the DOI enables the use of Compton telescope methods to further reduce the parallax error.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. A three-dimensional radiation dectecter assembly comprising:
    a plurality of thin semiconductor crystal dectector parallax error reduction modules, each of said parallax error reduction modules including first and second oppositely facing planar surfaces and at least one photon receiving edge surface between said planar surfaces,
    said first planar surface having formed thereon a single monolithic cathode,
    said second planar surface having formed thereon a two-dimensional array of pixelated anodes, outputs of said two-dimensional array of pixelated anodes containing information useful for determining depth of interaction of photons received at said at least one photon receiving edge surface, the depth of interaction being indicated by a location of an anode sensing photon absorption,
    said plurality of thin semiconductor crystal dectecter parallax error reduction modules being arranged in a stack such that photon receiving edge surfaces therefore together defined a photon receiving surface extending in two dimensions, and together providing photon impingement location information in said two dimensions, and said depth of interaction indicating information providing photon travel information, indicating photon travel having a component in a third dimension, perpendicular to said two dimension, for parallax error reduction.

2. A three-dimensional radiation detector according to claim 1, where the dimensions of said planar surfaces are sufficiently large that said dectecter absorbs substantially all high energy photons incident on it, produced by positionelectron annihilation phenomena.

3. A three-dimensional radiation detector according to claim 1, and array comprises rows and columns of pixels, and wherein said detector detects the depth of interaction of a photon in said assembly according to the column of said pixels that detects said photon.

4. A three-dimensional radiation detector according to claim 1, wherein said detector detects the point of a photon in said assembly in three dimensions.

5. A three-dimensional radiation detector according to claim 1, and also comprising a printed circuit board (PCB) disposed between two adjacent ones of said parallax error reduction modules in said stack, said circuit board being in electrical contact with said pixelated anodes and said cathode of said parallax error reduction modules on either side thereof.

6. A gamma ray camera comprising at least two detectors according to claim 1, wherein said camera is operative to determined the source of detected photons substantially without parallax errors.

7. A gamma ray camera comprising at least two detectors according to claim 1, and also operative to determine the path of a photon which has undergone multiple scattering in at least one of said detectors.

8. A three-dimensional radiation detector according to claim 1, and also comprising a printed circuit board (PCB) disposed between two adjacent ones of said parallax error reduction modules in said stack, said PCB being formed of a flexible and isolating polymer.

9. A three-dimensional radiation detector according to claim 8 and wherein conductive leads are formed on said PCB.

10. A method for detecting radiation comprising:
    providing a three-dimensional radiation detector including a plurality of thin semiconductor crystal dectecter parallax error reduction modules, each of said parallax error reduction modules including first and second oppositely facing planar surfaces and at least one photon receiving edge surface between said planar surfaces.
    said first planar surface having formed thereon a single monolithic cathode and said second planar surface having formed thereon a two-dimensional array of pixelated anodes, outputs of said two-dimensional array of pixelated anodes containing information useful for determining depth of interaction of photons received at said at least one photon receiving edge surface, the depth of interaction being indicated by a location of an anode sensing photon absorption,
    said plurality of thin semiconductor crystal detector parallax error reduction modules being arranged in a stack such that photon receiving edge surfaces thereof together define a photon receiving surface extending in two dimensions, and together providing photon impingement location information in said two dimensions, and said depth of interaction indicating information providing photon travel information indicating photon travel having a component in a third dimension, perpendicular to said two dimensions;
    disposing said detector to receive radiation impinging thereon at said photon receiving surface;
    determining a depth of a photon of a photon of said radiation; and
    employing said depth of interaction to eliminate parallax error.

11. A parallax corrected imaging method providing impingement location and depth of interaction information for an imagewise flux of incoming photons, the method comprising:
    directing an imagewise flux of incoming photons at a two dimensional photon receiving surface defined by elongate edge surfaces of a stack of thin semiconductor crystal detector depth of interaction indicating modules, each of said detector modules including first and second oppositely facing planar surfaces and at least one photon receiving edge surface between said planar surfaces, said first planar surface having formed thereon a single monolithic cathode and said second planar surface having formed thereon a two-dimensional array of pixelated anodes;

employing electrical signals from of said two-dimensional arrays of pixelated anodes to indicate depth of interaction of photons received at said two dimensional photon receiving edge surface and to provide photon impingement location information, the depth of interaction being indicated by the location of an anode sensing photon absorption; and employing said depth of interaction to eliminate parallax error.

* * * * *